US008228165B2

(12) United States Patent
Marchetto et al.

(10) Patent No.: US 8,228,165 B2
(45) Date of Patent: Jul. 24, 2012

(54) RADIO RECEIVER AND TRANSMITTER APPARATUS FOR RADIO-CONTROLLED AUTOMATION SYSTEMS FOR OPENING/CLOSURE

(75) Inventors: Oscar Marchetto, Oderzo (IT); Bruno Bortolan, Ponzano Veneto (IT); Paolo Campagnaro, Valvasone (IT); Stefano Fregonese, Mansue' (IT)

(73) Assignee: Nice S.p.A., Rustigne' Di Oderzo (IT)

( * ) Notice: Subject to any disclaimer, the term of this patent is extended or adjusted under 35 U.S.C. 154(b) by 1074 days.

(21) Appl. No.: 12/085,172

(22) PCT Filed: Mar. 2, 2007

(86) PCT No.: PCT/EP2007/001807
§ 371 (c)(1), (2), (4) Date: May 19, 2008

(87) PCT Pub. No.: WO2007/101619
PCT Pub. Date: Sep. 13, 2007

(65) Prior Publication Data

US 2009/0251280 A1 Oct. 8, 2009

(30) Foreign Application Priority Data

Mar. 7, 2006 (IT) .............................. MI2006A0409

(51) Int. Cl.
*B60R 25/00* (2006.01)
*G05B 19/00* (2006.01)
*G05B 23/00* (2006.01)
*G06F 7/00* (2006.01)
*H04B 1/00* (2006.01)

(52) U.S. Cl. ..................... 340/5.7; 340/12.5; 340/12.52; 340/5.71; 340/522; 700/90

(58) Field of Classification Search ................. 340/12.5, 340/12.52, 5.7, 5.71, 5, 522; 700/90
See application file for complete search history.

(56) References Cited

U.S. PATENT DOCUMENTS 4,178,549 A * 12/1979 Ledenbach et al. ........... 375/238
(Continued)

FOREIGN PATENT DOCUMENTS

EP 0 348 726 A 1/1990
(Continued)

OTHER PUBLICATIONS

2005 Crestron Product Catalog, Second Edition, Document No. 4998A, Jan. 31, 2005.*

(Continued)

*Primary Examiner* — Daniel Wu
*Assistant Examiner* — Frederick Ott
(74) *Attorney, Agent, or Firm* — Modiano & Associati; Albert Josif; Daniel O'Bryne

(57) ABSTRACT

An apparatus for radio-controlled automation systems for opening/closing curtains, entrance doors, rolling shutters, gates, barriers, electrical switches or the like, comprising a radio receiver which is coupled to an electric motor or to an electrical switch and comprising at least one radio transmitter for the remote actuation. The radio receiver comprises means for actuating the electric motor or the electrical switch on the basis of the content of an actuation radio signal which originates from the radio transmitter. The radio receiver comprises a memory storing a certificate which identifies the radio receiver and is adapted to provide an authorization for any operation at the radio receiver. The actuation means comprise stored instructions to perform the operation if the actuation signal comprises, in encoded form, the certificate in addition to a recognition code of the radio transmitter and a control code which corresponds to the operation to be performed.

22 Claims, 5 Drawing Sheets

U.S. PATENT DOCUMENTS

| | | | | |
|---|---|---|---|---|
| 4,385,296 | A * | 5/1983 | Tsubaki et al. | 340/12.5 |
| 4,529,980 | A * | 7/1985 | Liotine et al. | 340/9.16 |
| 4,695,739 | A | 9/1987 | Pierce | |
| 4,750,118 | A | 6/1988 | Heitschel et al. | |
| 4,918,690 | A | 4/1990 | Markkula, Jr. et al. | |
| 5,008,879 | A * | 4/1991 | Fischer et al. | 370/401 |
| 5,148,159 | A | 9/1992 | Clark et al. | |
| 5,519,878 | A | 5/1996 | Dolin, Jr. | |
| 5,602,536 | A * | 2/1997 | Henderson et al. | 340/5.23 |
| 5,661,804 | A * | 8/1997 | Dykema et al. | 380/274 |
| 5,751,224 | A * | 5/1998 | Fitzgibbon | 340/12.15 |
| 5,959,539 | A | 9/1999 | Adolph et al. | |
| 6,078,159 | A | 6/2000 | Valente et al. | |
| 6,324,089 | B1 | 11/2001 | Symoen et al. | |
| 6,791,467 | B1 | 9/2004 | Ben-Ze'ev | |
| 2002/0044042 | A1 | 4/2002 | Christensen et al. | |
| 2005/0024228 | A1 | 2/2005 | Vignon et al. | |
| 2005/0083224 | A1 | 4/2005 | Autret | |
| 2005/0088275 | A1 | 4/2005 | Valoteau et al. | |
| 2005/0225428 | A1 | 10/2005 | Autret et al. | |
| 2005/0237957 | A1 | 10/2005 | Autret et al. | |
| 2006/0033460 | A1 | 2/2006 | D'ayot | |
| 2007/0120641 | A1 | 5/2007 | Sommer et al. | |

FOREIGN PATENT DOCUMENTS

| | | | |
|---|---|---|---|
| FR | 2 685 505 | A1 | 6/1993 |
| WO | WO 03/107105 | A2 | 12/2003 |
| WO | WO 2004/086312 | A1 | 10/2004 |
| WO | WO 2005/081079 | A | 9/2005 |
| WO | WO 2006/048435 | A | 5/2006 |

OTHER PUBLICATIONS

Crestron Press Release, "Crestron Announces Built-In Support for DHCP, DNS and SSL for All 2-Series Systems", Jun. 3, 2003.*

* cited by examiner

RADIO RECEIVER AND TRANSMITTER APPARATUS FOR RADIO-CONTROLLED AUTOMATION SYSTEMS FOR OPENING/CLOSURE

The present invention relates to an apparatus, a radio transmitter and a radio receiver for radio-controlled automation systems, more particularly for small home automation, such as the opening/closure of doors, gates, blinds, awnings, or the switching on/off of lights or electrical devices in general.

A radio transmitter (hereinafter TX) is a generally portable battery-powered device which has one or more control buttons, the activation of which by the user generates a coded signal which modulates a radio-frequency signal which is emitted by the transmitter and radiated into the surrounding space.

A radio receiver (hereinafter RX), tuned to the same frequency as the TX, when it receives and recognizes the signal of the TX, typically activates a relay which represents the output of said RX. In practice, the relay in output to the RX "replicates" remotely the status of the button of the TX.

Usually, the output contact of the RX is used to control directly or indirectly the automation system. Automation systems in fact often have their own electrical or electronic control circuit, and the RX produces the "start" command for the electric control circuit. The "receiver" and the electric or electronic control circuit can be separate elements or can constitute a single unit. For example, the tubular motor known as Nice Neomat has an electronic board and a microcontroller which act as receiver and electric or electronic control circuit.

In radio controls the radio signal is usually coded both in order to increase immunity against radio noise and in particular to ensure that a given RX can be controlled by the corresponding TX or TXs. The output relay activates only if the TX sends the code that the RX considers correct. This is a requirement of the user, who wants to be sure that he has exclusive control of his automation system.

For the sake of simplicity, the code is represented by a more or less long sequence of numbers, represented in binary format.

In practice, the code can be provided by means of a series of small switches, which are arranged in the open or closed circuit position and physically allow to program the code.

The type of coding can be of the one-to-one type and fixed, i.e., given the same code in the TX and in the RX, the RX simply has to check that what it has received matches what it expects. A plurality of TXs with the same code can therefore control a same RX.

This solution can cause severe problems when one of the TXs is lost or stolen. To ensure security, it would in fact be necessary to change immediately the code of the RX and simultaneously withdraw and change the code of all the TXs, which otherwise would no longer be recognizable.

A first solution to the described problem is to provide the RX with a permanent memory which registers one or more possible valid codes. In practice, for example three TXs can have three different codes, all of which are registered and recognized by the RX. In this case, the loss of a TX would require only the deletion of the lost TX but not of all the others.

The registration operation generally occurs by "self-learning", i.e., an operating step, which can be activated conveniently on the RX, for example by closing a switch, which allows the RX to receive any transmitted code and insert it in the memory. Subsequently, the TX used in this step also will be recognized as valid.

The fact that storage occurs by self-learning, i.e., by using the normal reception step of the RX, is not free from drawbacks. Once the learning step has been activated, the RX might in fact store all the codes of the TXs that it receives, even if they are transmitted by mistake.

Moreover, the fact that the receiver recognizes each valid transmitter individually entails a further drawback. If, after storing the first transmitters, it is necessary to store others, it is necessary to access the receiver to close the switch which activates the learning procedure. This operation is not always possible or otherwise easy, because the receiver might not be easily accessible: for example, it might be placed in a junction box in a false ceiling.

Some solutions have a sort of self-activation, which entails a sequence of transmission operations with the new TX and with one which is already working. The use of an already-working TX is necessary because this TX (which is presumed to be owned by the legitimate owner) acts as an authorization "key".

However, even these known solutions still have other problems in addition to the ones mentioned above.

In particular, it is necessary to have at least one working TX whose code is stored in the RX, i.e., it is necessary to have a TX which acts as an authorization key.

Moreover, the operation must be performed in the vicinity of the receiver. For example, it is not possible to go to a shop or to the installer of the system, buy a new TX, and return home with the TX already working.

Finally, the new TX is stored in all the RXs located within the range of action of the TX and which recognize it as valid. For example, if the old TX has two buttons, one for operating a gate and one for operating the garage door of a same home, it is not possible to store a new TX which operates only the gate, since the key would be recognized also by the RX of the garage door.

As an alternative to the technique of self-learning by the RX of the code of the new TXs, it is possible to use the known technique of TX cloning. If the code is provided in the TX by means of a sequence of switches, it is sufficient to copy their position to obtain an identical and working TX.

More recently, even in TXs the series of switches for composing the code has been replaced by a code stored in a memory. This leads to at least two advantages in terms of security: the code can be "extended", i.e., composed of more digits, and therefore can be harder to guess by successive attempts and, by not being "visible" to the naked eye, it cannot be copied easily. However, it might be transferred by means of a physical link, such as a cable and an appropriate communications protocol to carry the code from one TX to the other.

In order to increase the security level, remote controls with a "variable code" or "rolling code" have now been used for some time. These products prevent the transmitted code from being easily captured and copied even remotely by using a sensitive receiver and a digital signal recorder.

The code sent by the TX is never the same, but at least one part is variable according to a logic which the RX also knows.

From what has been described so far, it is evident that the content of the memory of the receiver has become particularly valuable, since the memory contains all the codes and the corresponding variable parts of the TXs that can control a given automation system (in a gate of a condominium, these might be even a few hundred).

If the RX fails, even only in its memory, or if a corresponding TX is lost, it is necessary to access the memory of the RX, possibly by removing it from the case of the RX, and connect it to a specific instrument which allows to access the contained data in order to be able to modify them (for example, delete the code of the lost TX) or make a copy thereof to be used in case of failures. The drawback resides in that it must be possible to access physically the memory of the RX in order to be able to extract it or insert the connecting cable for data updating. Actually, access to the memory is not always possible, since in some cases the RXs can be mounted in an inaccessible position, such as for example within the body of a tubular motor.

The aim of the present invention is to overcome the drawbacks described above by providing an apparatus for automation systems with radio-controlled actuation, more particularly for home automation, which allows to enable new radio transmitters to control the automation system.

Within this aim, an object of the invention is to provide an apparatus which allows to store securely new radio transmitters in the memory of the radio receiver.

Another object of the invention is to allow an enabling process which does not require physical access to the radio receiver in order to activate learning or to arrange oneself in its proximity.

Moreover, an object of the present invention is to allow an enabling process which does not require the prior availability of a working radio transmitter.

Moreover, an object of the present invention is to prevent other radio receivers in the vicinity of the radio transmitter from being influenced by the latter.

Still another object of the invention is to provide an apparatus which is highly reliable, relatively easy to provide and at competitive costs.

This aim and these and other objects, which will become better apparent hereinafter, are achieved by an apparatus for radio-controlled automation systems for opening/closing curtains, entrance doors, rolling shutters, gates, barriers, electrical switches or the like, which comprises a radio receiver which is coupled to an electric motor or to an electrical switch for operating said opening/closure and/or switching on/off and comprising at least one radio transmitter for the remote actuation of said opening/closure, the radio receiver comprising actuation means for actuating said electric motor or said electrical switch on the basis of the content of an actuation radio signal which originates from said at least one radio transmitter, characterized in that said radio receiver comprises a nonvolatile memory which stores a certificate which identifies the radio receiver and is adapted to provide an authorization to perform an operation at said radio receiver, said actuation means comprising stored instructions to perform said operation if the actuation signal that originates from said at least one radio transmitter or from an external programming unit comprises, in encoded form, said certificate in addition to a recognition code of a radio transmitter and a control code which corresponds to the operation to be performed.

The aim and objects of the invention are also achieved by a radio receiver suitable for said apparatus, which comprises a receiver means for receiving a radio signal for actuation and an actuation means for actuating, on the basis of the content of the actuation radio signal, an electric motor or an electrical switch which can be connected to said actuation means, characterized in that said radio receiver comprises a nonvolatile memory which stores a certificate which identifies the radio receiver and is adapted to provide an authorization to perform an operation at said radio receiver, said actuation means comprising stored instructions to perform said operation if the actuation signal comprises in encoded form said certificate in addition to a recognition code of the radio transmitter and a control code which corresponds to the operation to be performed.

Moreover, the aim and objects of the invention are also achieved by a radio transmitter suitable for the same apparatus, which comprises a memory which stores the identifying recognition code of said radio transmitter, and transmitter means which are connected to said memory in order to assemble and transmit, in reply to a manual command on the radio transmitter, an actuation radio signal which comprises at least said recognition code and the control code, characterized in that said radio transmitter comprises, stored in said memory, at least one identification certificate, said certificate being adapted to provide an authorization to perform an operation on a remote radio receiver or on another radio transmitter, the transmission means being adapted to include said certificate in the actuation signal in addition to said recognition code and said control code.

Advantageously, the apparatus according to the invention further comprises a programming unit which is external to said radio receiver and radio transmitter and comprises a radio transceiver which is adapted to communicate with the radio receiver and/or with the radio transmitter, and comprises an input device for receiving update commands on the part of a user, the programming unit being adapted to transmit said update commands by means of the transceiver, the radio receiver and/or the radio transmitter being adapted to modify the contents of their respective memory on the basis of the content of the update commands which are sent and transmitted by radio by the programming unit.

Preferably, in order to interact with the programming unit, the radio receiver comprises a radio transmitter section and the radio transmitter comprises a radio receiver section, in order to be able to communicate or modify the content of the respective memories. In particular, the radio transmitter comprises a radio receiver section indeed to receive and store the certificate transmitted by another radio transmitter.

Advantageously, the transmission means of the radio transmitter can contain stored instructions to include the certificate in the actuation signal only a preset number of times, and the certificate is associated uniquely with a single button of the device.

Moreover, the actuation means can contain further stored instructions for performing the operation associated with the control code even if the actuation signal does not contain said certificate but the recognition code included in said actuation signal is already stored in the nonvolatile memory of the radio receiver. The actuation means of the radio receiver can also comprise further stored instructions for storing said recognition code in the memory of the radio receiver if it has not been already stored previously.

Further characteristics and advantages of the invention will become better apparent from the description of a preferred but not exclusive embodiment of the apparatus, of the radio receiver and of the radio transmitter according to the invention, illustrated by way of non-limiting example in the accompanying drawings, wherein.

Figure 1:
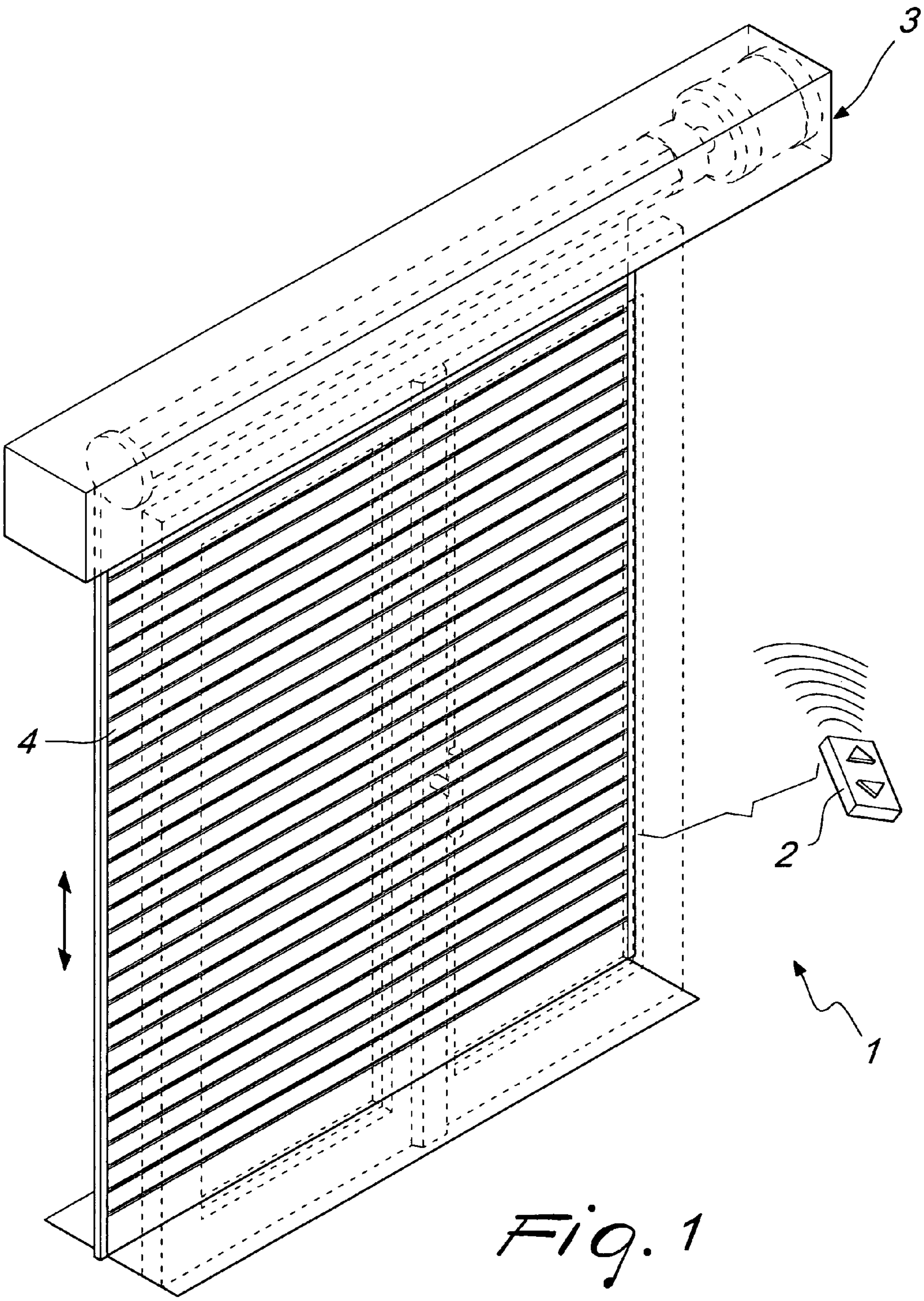
FIG. 1 is an example of application of the apparatus according to the invention for opening/closing the blind of a window.
Figure 2:
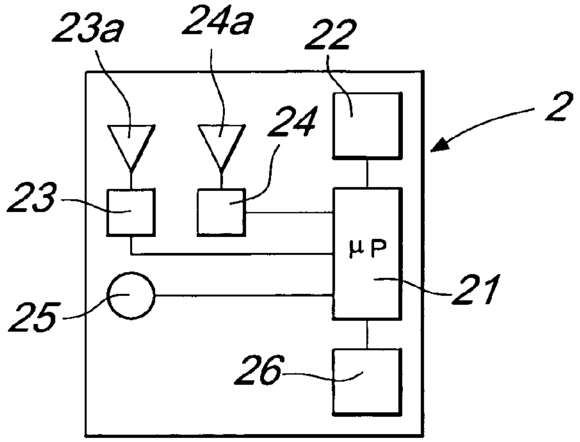
FIG. 2 is a diagram of a radio transmitter according to the invention.

With reference to FIGS. 1 to 4, the apparatus according to the invention, generally designated by the reference numeral 1, comprises a radio transmitter (TX) 2, which is connected to a radio receiver (RX) 3 for remote control of the opening/closure, for example, of a blind 4. The RX 3 is coupled to an electric motor, the shaft of which engages the roller of the blind 4 in order to roll up or roll down said blind.

Of course, the blind and the corresponding electric motor are only a non-limiting example of a possible embodiment of the invention, which is applied in any other automation system for radio-controlled opening/closure not only of doors, gates, entrance doors, barriers, shutters or the like but also of electrical switches or electrical/electronic/electromechanical devices in general.

Going back to the example, the TX 2 comprises a microcontroller 21 and at least one nonvolatile memory 22, which stores a recognition code which is associated with the TX 2 and acts as an identifier of said TX 2. The stored recognition code is the typical code which is transmitted by the radio transmitters to the radio receiver together with a control code in order to identify the radio transmitter and activate the remote-control automation system.

The memory 22 preferably also stores the instructions to perform the remote control procedures and for updating data which are used in the invention and are described hereinafter. As an alternative, said instructions can be stored in a second memory which is different from the memory 22, for example in a memory which is internal to the microcontroller 21.

The TX 2, which is powered by means of batteries 26, further comprises a control button 25, which can be activated manually, and transmitter means, which are connected to the button 25 and to the memory 22 to assemble and transmit, as a response to a manual actuation on the button, a radio signal for remote actuation.

In greater detail, the transmitter means comprise the microcontroller 21 and preferably a transmitter antenna 23*a*, which is connected to the corresponding transmitter circuit 23, which in turn is connected to an output port of the microcontroller 21 in a manner which is per se known in the field.

The microcontroller 21 is programmed to assemble and transmit the radio signal for remote actuation in response to a command input by pressing the button 25. Moreover, the microcontroller 21 is programmed to interpret commands which are input by means of a particular succession of pressures of the button 25.

Advantageously, the TX 2 is also provided with a low-sensitivity radio receiver section, which comprises said microcontroller 21, a receiver antenna 24*a* and the corresponding receiver circuit 24, which is connected to an input port of the microcontroller 21 in a manner which is per se known in the field.

Figure 3:
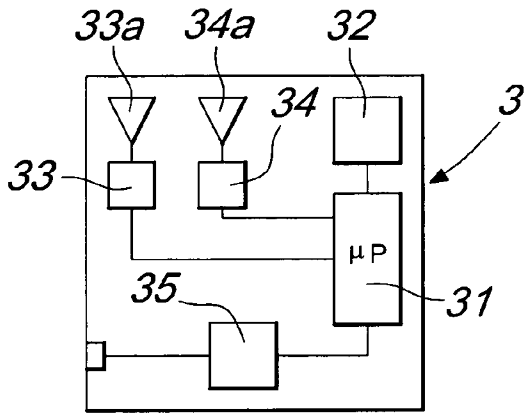
FIG. 3 is a diagram of a radio receiver according to the invention.

With reference to FIG. 3, the radio receiver (RX) 3 is provided with a receiver means for receiving the radio signal for actuation; said receiver means preferably comprises a receiver antenna 34*a* and the corresponding receiver circuit 34, of a type which is notoriously used in the field of the invention.

Advantageously, the RX 3 comprises a low-power radio transmitter section 33*a* and 33.

Moreover, the RX 3 comprises a nonvolatile memory 32 and actuation means for actuating the electric motor on the basis of the content of the actuation radio signal that arrives from the TX 2, which preferably comprise a microcontroller 31 and an actuator 35 (for example a power circuit for driving motors).

The memory 32 stores permanently a certificate which identifies the radio receiver and is associated uniquely with it.

The certificate is a numeric code which is stored in the memory 32 during the manufacture of the RX and allows to identify each RX uniquely. It can be modified advantageously by using an external programming device, with which specialized personnel is normally equipped. Preferably, the same code is provided in readable form on a label which is applied to the RX and/or on a tag which can be removed so that it can be stored in a safe place by the user.

The purpose of the certificate used in the invention is to submit and obtain an authorization for the operations required by the device that submits said certificate, which is otherwise unknown and not enabled. For example, the TX 2 can ask the RX 3 to store its recognition code by submitting the certificate of the RX as an authorization.

Each device, be it TX or RX, can comprise in storage, in addition to its own certificate and recognition code, a plurality of certificates or/and recognition codes of other TXs.

Therefore, the microcontroller 31 used in the RX according to the invention comprises stored instructions for actuating the electric motor connected to the RX only if the radio signal for actuation that it receives from the TX 2 comprises said certificate in addition to the recognition code and to the control code transmitted by the TX 2 or, if said certificate is not present in the signal, if the recognition code transmitted by the TX 2 and included in the actuation signal is already stored in the nonvolatile memory 32 of the RX.

In greater detail, the microcontroller 31 comprises stored instructions to check whether the detected actuation signal that arrives from a TX contains said certificate or a recognition code which is stored in the memory 32. The microcontroller is also programmed to acquire the recognition code which identifies the TX 2 and is contained in the actuation signal transmitted by the TX 2, to check whether it is already stored in the memory of the radio receiver and, if not, store it in the memory 32.

The identifying recognition code of the TX 2 which sends the actuation signal can therefore be accompanied by the certificate of the RX or by the certificate and/or recognition code of another TX which is already authorized at the RX 3, which thus replaces the certificate of the RX to obtain the authorization for the requested operation.

At the same time, the TX 2 is capable of receiving and storing in the nonvolatile memory 22 the certificate of the remote radio receiver 3 or a certificate and/or identifying recognition code of another TX which is enabled at the radio receiver 3 by means of the radio receiver section. These codes can be encrypted in any manner commonly used in the field of the invention.

Moreover, the microcontroller 21 of the TX 2 is programmed to add the certificate or recognition code of another TX in the radio signal for actuation which is transmitted by means of the transmitter 23 and 23*a* in addition to its own recognition code and to the control code.

Figure 4:
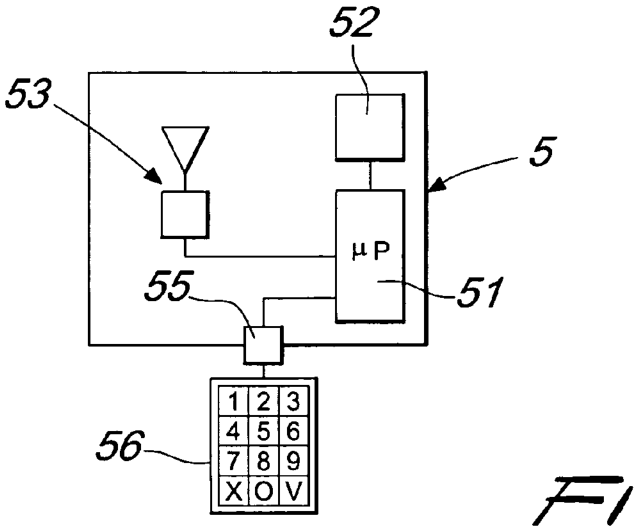
FIG. 4 is a diagram of a programming unit according to the invention.

Preferably, the apparatus according to the invention is further provided with a programming unit 5, which is external to the RX 3 and to the TX 2 and is shown schematically in FIG. 4. The programming unit 5 comprises a microprocessor 51 which stores appropriate management instructions, a memory 52, optionally of the removable type, and a radio transceiver 53 which is adapted to exchange radio signals with the RX 3 and/or with the TX 2.

Moreover, the unit 5 is provided with an input device, such as for example a keypad 56, which is connected to the microprocessor 51 by means of a known interface 55 in order to allow the input of commands on the part of the user. These commands can consist of commands for updating the information contained in the memories of the RX 3 and of the TX 2 or other commands such as memory deletion or the transfer of content from said memories to the memory 52 of the unit 5.

The microprocessor 51 of the unit 5 is programmed to transmit wirelessly, by means of the transceiver 53, these update commands so as to modify the content of the destination memory.

An example of command might be the registration of a certificate in a TX. The number of the certificate, in this case, is read by the user from the label or tag of the RX, is entered in the unit 5 by means of the keypad 56 and, with a send command, is transmitted wirelessly to the RX, for example in binary format.

Another example of command might be the acquisition of the content of the memory of the RX 3. The microcontroller 31 of the RX 3, being further programmed to perform commands or requests contained in the actuation radio signals detected by the receiver 34-34*a*, interprets the received command, in the specific case the transmission of the recognition codes stored in the memory 32, and in response to this request it transmits by radio the codes by means of the radio transmitter section 33-33*a*.

Figure 5:
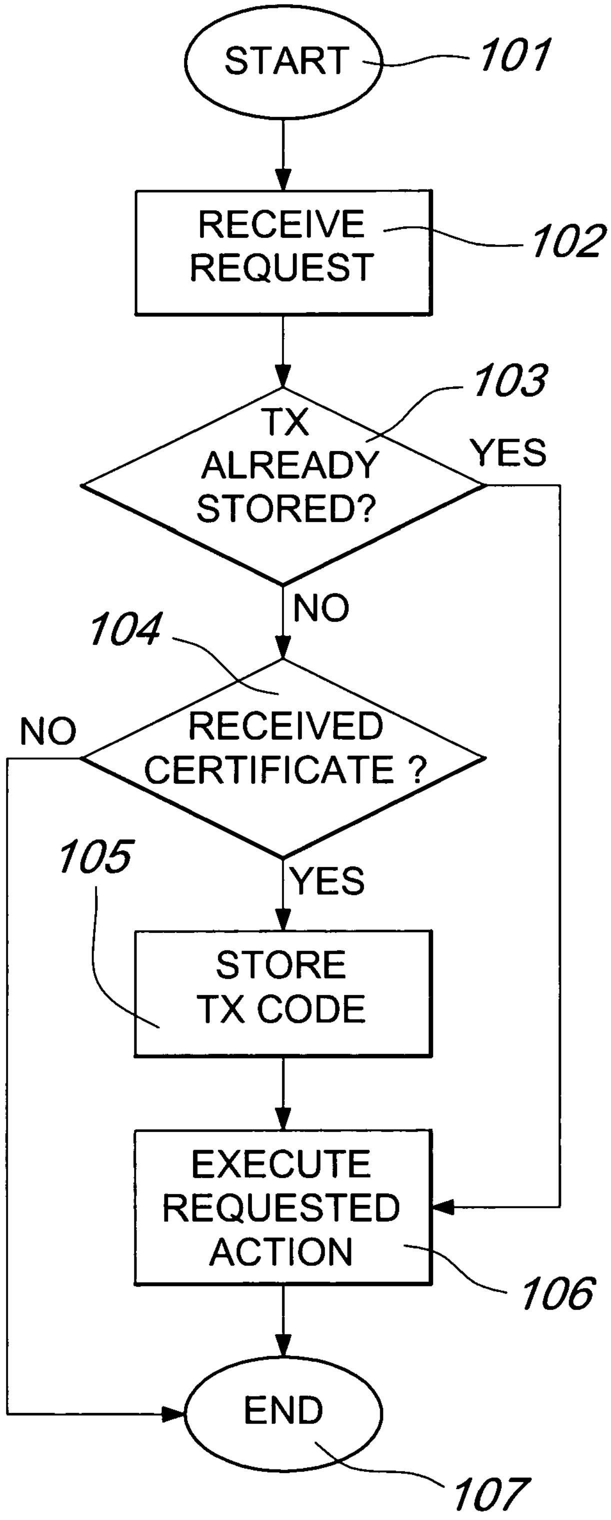
FIG. 5 is a diagram of the procedure for the execution of a remote control at the radio receiver.
Figure 6:
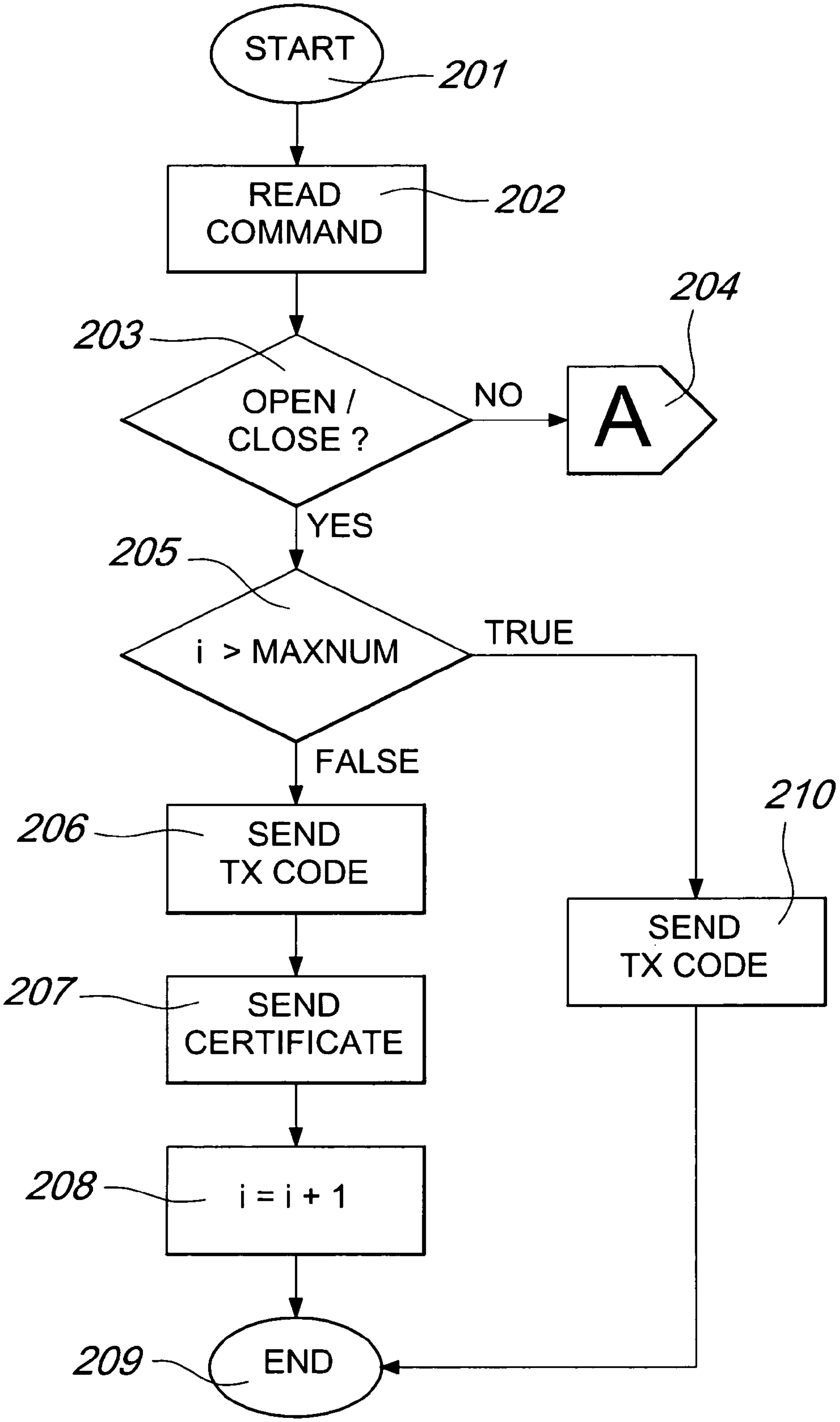
FIG. 6 is a diagram of the procedure for the execution of a manual command on the radio transmitter.

In view of what has been described, the operation of the apparatus is as follows. With reference to FIG. 5, the RX 3 is generally in a standby status 101 or waiting for commands in the form of radio signals for actuation.

The actuation signals produced by the radio transmitters are preferably composed of a succession of binary digits transmitted sequentially.

For the remote opening/closure commands, the first part of the binary code corresponds to the recognition code of the TX 2 that is transmitting, followed by the binary code that corresponds to the certificate of the RX 3 or to the recognition code of another TX which is enabled at the RX 3.

The certificate is preferably appended as a frame at the end of any code which is transmitted either by the TX or by the programming unit 5.

When the RX detects an actuation radio signal (step 102), the RX checks from the first received digits whether it contains a recognition code TX which is already stored in the nonvolatile memory 32 and, if it is, it performs the requested operation (step 106).

Otherwise, the RX checks whether the received code contains the certificate associated with said RX. If it does not, the procedure ends (step 107) and the RX ignores the received actuation signal. Otherwise, in step 105, the RX 3 stores the recognition code in the memory 32, because the code was accompanied by a valid certificate. Assuming that the transmitting TX is enabled, the RX actuates the electric motor as requested, and the procedure ends (step 107).

Usually, the TX 2 also is in a state 201 in which it waits for commands and from which it exits by pressing one of its buttons 25. In this case, in step 202 the microcontroller 21 of the TX interprets the command requested by the user on the basis of how or how many times the button 25 is pressed (in the case of a TX with a single button) or on the basis of which button is pressed or of the sequence according to which the buttons are pressed (in the case of a TX with a plurality of buttons).

The microcontroller 21 checks whether the command entered by the user is simply an open/close command (step 203). If it is, in step 205 the microprocessor 21 checks whether the certificate stored in the TX has already been transmitted by radio a preset number (MAXNUM) of times.

The transmission means of the TX according to the invention in fact preferably contain stored instructions to include only a preset number of times the certificate or recognition code of another TX which is stored in the memory 22 in the actuation radio signal to be sent to the RX.

The step 205 is preferred, because the frame appended to the recognition code of the TX 2, which is representative of the certificate which is enabled at the RX, slows the radio transmission of the binary code. It is therefore preferable to avoid transmitting an excessively long code when the TX has been permanently recognized as enabled at the RX.

If the microcontroller 21 detects that the certificate has been transmitted by radio more than the preset number of times, the TX 2 transmits only its own recognition code (step 210).

If the microcontroller 21 detects that the certificate has not been transmitted by radio more than MAXNUM, in step 206 the TX transmits its own recognition code and, appended thereto, the certificate enabled at the RX (step 207).

The microcontroller 21 finally registers that the certificate or enabled code has been transmitted another time (step 208) and the procedure ends.

Figure 7:
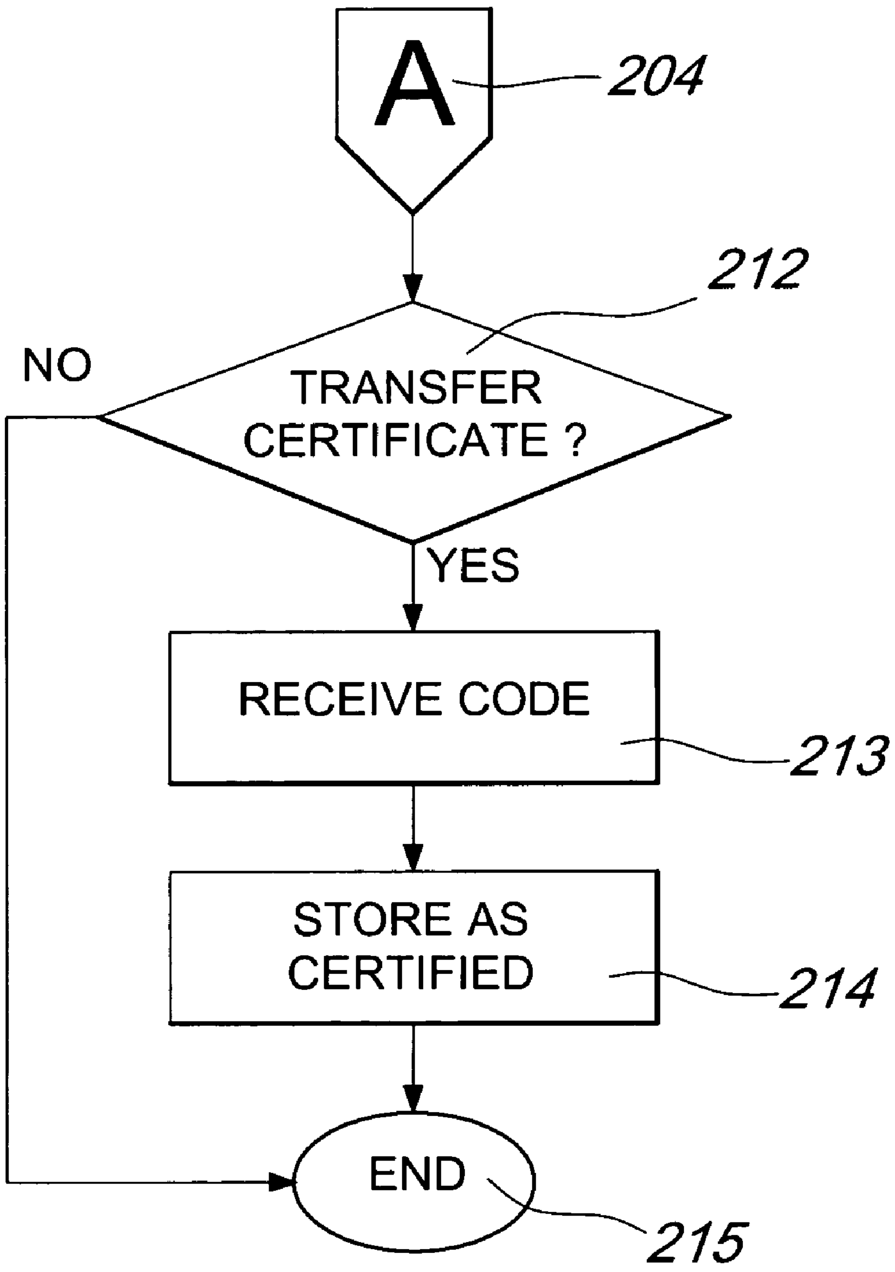
FIG. 7 is a diagram of the procedure for storing a recognition code at the radio transmitter.

If in step 203 the microprocessor 21 detects that the command entered by means of the button is not a command to actuate the electric motor or switch associated with the RX, step 204 performs an alternative procedure, which in the exemplifying case shown in FIG. 7 consists in storing a recognition code at said TX.

Interpreting the manual command issued by the user, the microcontroller 21 checks whether it is a certificate transfer command (step 212) and, if not, the procedure ends (step 215) or moves on to another possible procedure (for example a procedure for reprogramming the buttons of the TX, which is not shown).

Otherwise, the TX detects the signal received by its radio receiver section 24-24*a*, extracting the received certificate or recognition code (step 213) and stores it in the memory 22. This code is therefore considered by the TX as a certificate and accordingly is transmitted every time that the TX is used to control the remote automation system, maintaining the possibility to limit the number of times (MAXNUM) for which the certificate is transmitted.

A practical case that can occur is the following. A tubular motor for awnings is installed 10 meters above the ground on the face of a building. The motor is provided with an RX for remote control but has been installed by the manufacturer of the awning, which has issued a label on which the certificate of the RX is printed. To activate a TX, it is sufficient to use the programming unit 5 by entering the certificate read from the label on the keypad 56, optionally choose the button of the TX with which it is to be associated, place the TX close to the programming unit and activate the certificate transfer function 204. The TX can thus transmit its own recognition code with the addition of the certificate, and the RX, as soon as it has verified that the received certificate is its own, stores the code of the TX.

At a later time, the user might need a new transmitter. In this case, it will be sufficient to place the new TX close to the enabled TX and activate the certificate transfer procedure 204, which must allow the two TXs to recognize the certificate transfer step with respect to normal use.

By way of example, the procedure 204 can comprise the following steps:

pressing one of the buttons provided on the new TX, the radio signal of which activates the low-sensitivity radio receiver section 24*a* of the enabled TX pressing one of the buttons provided on the enabled TX with transmission of the certificate In this way, the user can decide which of the TXs transmits its own certificate and which one must receive it.

Thus, when the new TX is used, the RX checks whether the received certificate is associated with a TX which has already been enabled and, if it finds one, stores the new recognition code. This operation is transparent to the user, who does not have to perform any operation other than the normal use of the TX.

The motor of the awning might fail. By means of the programming unit 5, it is possible to send the certificate of the RX to the RX itself and, after its recognition/enabling, access the content of the memory, retrieve all the enabled recognition codes and store them locally on the programming unit. The list of codes that are present can then be transferred to more capacious storage systems, optionally associating with each recognition code the indication of the name of the respective owner. The list of codes can thus be retransmitted to the memory of the new motor.

If the respective owner loses a TX, the programming unit in combination with the instructions stored on the RX allows to access the memory of the RX, deleting the code of the lost TX.

Another possible situation arises when it is not possible to have the programming unit 5 available. In this case, the microcontroller 21 of the TX is programmed specifically to transmit by radio commands which are different from the simple opening/closure command.

If the TX has a single button 25, the certificate can be transmitted to the RX by pressing several times the button 25 of the TX according to a preset encoding. For example, if the certificate has five decimal digits, it is possible to press the button of the TX a number of times which matches the first digit (in decimal format) of the certificate, wait for three seconds, and repeat the procedure for every other digit of the certificate.

In this case, the RX 3 checks the times that elapse between one transmission and the next. If the time is short (less than one second), the microcontroller 31 of the RX increases the count that represents the digit of the certificate and, if the time is longer, the count is closed and the count for the next digit begins. The procedure ends with the comparison described above between the received certificate and the certificate stored in the RX.

An alternative procedure can consist in transmitting the digit of the certificate in binary format, in which the prolonged pressing of a button corresponds to one numeral (for example "1") and a short pressure corresponds to the opposite numeral ("0").

If the TX has two buttons (for example for up and down motion), the certificate can be transmitted by transmitting the binary equivalent of the certificate, by using one button for the numeral "1" and the other button for the numeral "0". The RX reconstructs the received code on the basis of the rapid temporal succession of up and down commands received, and compares this code with the stored recognition codes or certificate.

Optionally, regardless of the method used, once the sending of the certificate has ended, it is possible to proceed as described above to send a chosen command, such as the addition of the code, the deletion of the code, the total deletion of the code memory of the RX, and so forth.

In practice it has been found that the apparatus according to the invention fully achieves the intended aim, since it allows to enable new radio transmitters to control the automation system securely and without having to physically access the interior of the radio receiver to activate learning even without placing oneself in its proximity. This is possible by virtue of the use of a certificate, which allows to access all the functions of the apparatus and can be transferred or carried from one device to another device, be they radio transmitters, radio receivers or programming units.

The certificate can be entered in the different devices by means of an external unit, such as the programming unit, or by means of a radio transmitter of the apparatus. The certificate can be stored in a new radio transmitter also by acting manually on the buttons of the radio transmitter if other enabled radio transmitters in the system or a programming unit are not available.

Moreover, the certificate can be associated uniquely with a single button of a radio transmitter, so that a transmitter with multiple buttons can have multiple certificates.

The description provides a preferred embodiment, according to which a single certificate is assigned to the RX. In other embodiments of the invention, even multiple certificates (for example five different and unique certificates) can be assigned to the RX and be stored in the memory 32 and provided in readable form on the label or removable tag. In this manner it is possible to create different groups of devices which are controlled, managed and programmed by a respective certificate, for example one group for all the blinds of a room, another group for the lights, yet another group for the outdoor curtains which look onto the garden, and so forth.

It is possible to assign the same certificate to one or more devices (actuators or radio receivers) which are controlled and define a specific group, so as to be able to control, manage and program them at the same time by means of a single command on the TX or on the external programming unit.

As an alternative or in addition to the assignment of a single certificate to a group of devices, in the system according to the invention the individual certificate assigned to the RX can be personal, i.e., assigned to a certain user.

In this manner, it is possible to assign to a respective button of a TX the transmission of a certificate which corresponds to a person who is assumed to be pressing the button and which therefore corresponds to a series of settings stored in the RX.

When the button is pressed on the TX, the controlled devices to which the certificate is assigned assume the preset position stored by the particular user. For example, two users who use the same room and like different lighting levels can therefore preset in the RXs in a different manner the position of curtains and/or blinds and retrieve the chosen positions by pressing the respective personal button on the TX.

Although the apparatus according to the invention has been conceived in particular for small home automation systems, it can in any case be used more generally for applications which are based on radio controls, such as for example the remote opening of the doors of a car.

The apparatus thus conceived is susceptible of numerous modifications and variations, all of which are within the scope of the appended claims; all the details may further be replaced with other technically equivalent elements.

The disclosures in Italian Patent Application no. MI2006A000409 from which this application claims priority, are incorporated herein by reference.

What is claimed is:

1. An apparatus for radio-controlled automation systems for opening/closing curtains, entrance doors, rolling shutters, gates, barriers, electrical switches or the like, comprising a radio receiver which is coupled to an electric motor or to an electrical switch for operating said opening/closure and comprising a plurality of radio transmitters for the remote actuation of said opening/closure, each one of said radio transmitters comprising a nonvolatile memory which stores an identifying recognition code of said each one of said radio transmitters, the radio receiver comprising actuation means for actuating said electric motor or said electrical switch on the basis of the content of an actuation radio signal which originates from said radio transmitters, wherein said radio receiver comprises a nonvolatile memory which stores a certificate which identifies the radio receiver and is adapted to provide an authorization to perform any operation at said radio receiver, a first radio transmitter of said radio transmitters having a first identifying recognition code thereof stored in the nonvolatile memory of said first radio transmitter, and said first radio transmitter receiving and storing in the nonvolatile memory thereof: said certificate which identifies the radio receiver or a second identifying recognition code of a second radio transmitter of said radio transmitters which is enabled at said radio receiver, said actuation means comprising stored instructions adapted to check whether said first identifying recognition code is already stored in said nonvolatile memory of the radio receiver and, if not, to store said first identifying recognition code in said nonvolatile memory of the radio receiver, and adapted to perform said operation if the actuation signal that originates from said at least one radio transmitter or from an external programming unit comprises, in encoded form, said certificate or the second identifying recognition code of the second radio transmitter which is enabled at said radio receiver in addition to the first identifying recognition code of the first radio transmitter and a control code which corresponds to the operation to be performed.

2. The apparatus according to claim 1, wherein said actuation means further contain stored instructions to perform the operation associated with the control code even if said actuation signal does not contain said certificate but contains the first recognition code of said first radio transmitter, or a recognition code of said external programming unit, already stored in the nonvolatile memory of the radio receiver.

3. The apparatus according to claim 1, comprising a said programming unit which is external to said radio receiver and said radio transmitter, said programming unit comprising a radio transceiver which is adapted to communicate with said radio receiver and/or with said radio transmitters and comprising an input device for receiving update commands on the part of the user, said programming unit being adapted to transmit said update commands by means of said transceiver, said radio receiver and/or said radio transmitters being adapted to modify the content of the respective memory on the basis of the content of said update commands sent and transmitted by radio by said programming unit.

4. The apparatus according to claim 3, wherein said update commands comprise said certificate and/or recognition codes of radio transmitters.

5. The apparatus according to claim 1, wherein a control encoded within said control code consists of any operation chosen among the actuation of the electric motor or of the electric switch or the updating of the content of the memory of the radio receiver.

6. The apparatus according to claim 1, wherein said radio receiver comprises a low-power radio transmitter section which is connected to said actuation means, said actuation means further comprising stored instructions to receive a request for transmission of stored recognition codes, said request being encoded within said control code, and for radio transmission, in reply, of the content of said nonvolatile memory by means of said radio transmitter section.

7. The apparatus according to claim 1, wherein said certificate is a code which can be read by a user and is written or printed on a removable label or tag which is present on the radio receiver and/or on the radio transmitters.

8. The apparatus according to claim 1, wherein said actuation signal is encrypted.

9. The apparatus according to claim 1, wherein said certificate comprises completely or partially the recognition code of the radio transmitters.

10. The apparatus according to claim 1, wherein the certificate is a code which can be entered in a memory of each device by means of a button of the device.

11. The apparatus according to claim 1, wherein said memory of the radio receiver comprises a plurality of certificates in association with respective users, said memory of said radio receiver further comprising at least one stored instruction which is uniquely associated with each certificate of said plurality of certificates, said radio receiver being adapted to perform the operation associated with said instruction if said recognition signal comprises the certificate associated with said instruction.

12. The apparatus according to claim 1, wherein said certificate is uniquely associated with a group which contains a plurality of actuation means and/or a plurality of radio receivers, so that an actuation signal which contains said certificate is adapted to control only the actuation means and/or the radio receivers that belong to the group with which said certificate is associated.

13. The apparatus according to claim 12, wherein said radio receiver comprises a stored plurality of certificates associated with respective groups of actuation means and/or radio receivers.

14. The apparatus according to claim 1, wherein said radio transmitters each comprises a plurality of buttons, with each of which it is possible to associate a different certificate so that one or more presses of one of said plurality of buttons corresponds to the transmission of a respective certificate.

15. The radio receiver for the apparatus according to claim 1, comprising a receiver means for receiving the actuation radio signal and the actuation means for actuating, on the basis of the content of the actuation radio signal, the electric motor or the electrical switch which can be connected to said actuation means, wherein said radio receiver comprises the nonvolatile memory which stores the identification certificate of the radio receiver which is adapted to provide the authorization to perform the operation at said radio receiver, said actuation means comprising stored instructions to perform said operation if the actuation signal comprises, in encoded form, said certificate in addition to the recognition code of the radio transmitter and the control code which corresponds to the operation to be performed.

16. The radio receiver according to claim 15, wherein said actuation means further comprise stored instructions to perform the operation associated with the control code that is received even if said actuation signal does not contain said certificate but contains the first recognition code of the first radio transmitter which is already stored in said nonvolatile memory of said radio receiver.

17. The first radio transmitter for the apparatus according to claim 1, comprising the memory of the first radio transmitter which stores the first identifying recognition code of said first radio transmitter and transmitter means which are connected to said memory of the first radio transmitter in order to assemble and transmit, in reply to a manual command on the first radio transmitter, an actuation radio signal which comprises at least said first recognition code of the first radio transmitter and the control code, wherein said first radio transmitter comprises, stored in said memory of the first radio transmitter, at least one said certificate, which is adapted to provide an authorization to perform an operation on said remote radio receiver or on another radio transmitter, the transmission means being adapted to include said certificate in the actuation signal in addition to said first recognition code and said control code.

18. The first radio transmitter according to claim 17, further comprising a radio receiver section for receiving and storing the certificate transmitted by another radio transmitter and/or by the external programming unit.

19. The first radio transmitter according to claim 17, wherein the transmitter means of said first radio transmitter contain stored instructions to include said certificate in the actuation signal only a preset number of times.

20. The first radio transmitter according to claim 17, wherein said certificate is associated uniquely with a single button of the device.

21. The first radio transmitter according to claim 17, wherein said certificate can be stored in a transceiver only on the basis of a preset succession of presses of at least one button of said transceiver on the part of the user.

22. The first radio transmitter according to claim 17, wherein said memory of said firsts radio transmitter contains, in addition to its own, the certificate of any one of the devices that compose the apparatus according to the invention.

* * * * *